United States Patent
O'Brien

(10) Patent No.: US 11,183,309 B2
(45) Date of Patent: Nov. 23, 2021

(54) METHODS OF FORMING FUEL RODS COMPRISING POROUS FUEL MATERIALS

(71) Applicant: Battelle Energy Alliance, LLC, Idaho Falls, ID (US)

(72) Inventor: Robert C. O'Brien, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 140 days.

(21) Appl. No.: 16/220,661

(22) Filed: Dec. 14, 2018

(65) Prior Publication Data

US 2020/0027578 A1   Jan. 23, 2020

Related U.S. Application Data

(60) Provisional application No. 62/610,395, filed on Dec. 26, 2017.

(51) Int. Cl.
| | |
|---|---|
| *G21C 21/02* | (2006.01) |
| *G21C 3/04* | (2006.01) |
| *G21C 3/20* | (2006.01) |
| *G21C 3/62* | (2006.01) |

(52) U.S. Cl.
CPC .............. *G21C 3/044* (2013.01); *G21C 3/20* (2013.01); *G21C 3/623* (2013.01); *G21C 21/02* (2013.01)

(58) Field of Classification Search
CPC ... G21C 3/00; G21C 3/06; G21C 3/07; G21C 3/16; G21C 3/20; G21C 3/042; G21C 3/045; G21C 3/047
See application file for complete search history.

(56) References Cited

U.S. PATENT DOCUMENTS

| | | | | |
|---|---|---|---|---|
| 3,801,450 A | * | 4/1974 | Barthels | G21C 3/042 |
| | | | | 376/429 |
| 4,759,911 A | * | 7/1988 | Bingham | G21C 3/042 |
| | | | | 376/428 |
| 8,792,607 B2 | * | 7/2014 | Kim | G21C 3/20 |
| | | | | 376/305 |
| 9,299,462 B2 | | 3/2016 | Baek et al. | |
| 10,410,753 B2 | * | 9/2019 | Cheatham, III | G21C 3/04 |
| 2009/0022259 A1 | * | 1/2009 | Gray | C23C 4/08 |
| | | | | 376/416 |
| 2014/0254740 A1 | * | 9/2014 | Ledford | G21C 3/07 |
| | | | | 376/417 |

(Continued)

*Primary Examiner* — Jack W Keith
*Assistant Examiner* — Jinney Kil
(74) *Attorney, Agent, or Firm* — TraskBritt

(57) ABSTRACT

A method of forming a fuel rod for a nuclear reactor comprises disposing a powder comprising particles of a fuel material on a substrate, exposing the powder to energy from an energy source to form a first layer of a nuclear fuel, the first layer comprising inter-granular bonds between the particles of the fuel material, disposing additional powder comprising particles of the fuel material over the first layer of the nuclear fuel, and exposing the additional powder to energy from the energy source to form a second layer of the nuclear fuel and to form the nuclear fuel to have a void fraction greater than about 0.20, the second layer comprising inter-granular bonds between the additional powder and the first layer of the nuclear fuel. Related nuclear fuels comprising a porous structure, fuel rods, nuclear reactors, and methods are disclosed.

23 Claims, 7 Drawing Sheets

(56) References Cited

U.S. PATENT DOCUMENTS

2015/0063524 A1* 3/2015 Yacout ............. C23C 16/45555
  376/417
2020/0027577 A1* 1/2020 Cheatham, III ......... G21C 3/16
2020/0321134 A1* 10/2020 O'Brien ................ B29C 64/153

* cited by examiner

METHODS OF FORMING FUEL RODS COMPRISING POROUS FUEL MATERIALS

CROSS-REFERENCE TO RELATED APPLICATION

This application claims the benefit under 35 U.S.C. § 119(e) of U.S. Provisional Patent Application Ser. No. 62/610,395, filed Dec. 26, 2017, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to methods of additively manufacturing one or more structures of a nuclear reactor. More particularly, embodiments of the disclosure relate to methods and apparatuses for manufacturing a porous nuclear fuel by additive manufacturing, to nuclear fuel reactors or components thereof including the porous nuclear fuel, and to related methods.

BACKGROUND

Nuclear reactors include fuel rods, plates, or assemblies containing a nuclear fuel surrounded by cladding. Fission of the nuclear fuel produces heat, which in turn, is used to generate electricity, such as by powering a turbine with steam generated by the heat. Nuclear fuels include ceramic fuels, or metallic and cermet fuels. Metallic and cermet fuels are often preferred to conventional ceramic fuels because the metallic and cermet fuels exhibit a greater thermal conductivity than conventional fuels including only ceramic fuel materials.

In use and operation, the nuclear fuel may exhibit so-called "neutron-induced swelling" wherein the nuclear fuel increases in volume and decreases in density when subjected to intense neutron radiation. In addition to neutron-induced swelling, as a result of thermal expansion, the nuclear fuel increases in volume responsive to exposure to the elevated temperatures of the nuclear reactor. As the nuclear fuel swells, the nuclear fuel may impede on structures disposed around the nuclear fuel, such as cladding containing the nuclear fuel. Swelling of the nuclear fuel results in undesired stresses on the cladding surrounding and contacted by the swollen nuclear fuel. If the expansion of nuclear fuel is more than a certain amount, the cladding surrounding the nuclear fuel may crack or otherwise fail.

In order to accommodate swelling of the nuclear fuel under operating conditions, it has been known to dispose molten sodium between the cladding and the nuclear fuel. The molten sodium is a displaceable media that bonds the cladding material to the nuclear fuel. However, as the nuclear fuel expands toward the cladding, the sodium is pushed into a head spaced of the fuel rod assembly, reducing the heat transfer from the nuclear fuel to the cladding, ultimately reducing the effectiveness of the fuel rod. In addition, the sodium is exposed to fission products and must be treated prior to disposal thereof after the useful like of the fuel rod. Further, in the case of light water reactors, sodium is typically undesired due to the reaction between water and sodium.

Nuclear fuels are conventionally coupled to a heat exchange mechanism for transferring thermal energy from the nuclear fuel to another portion of the nuclear reactor for power generation. Without the use of subtractive machining, the nuclear fuel is conventionally limited to right cylindrical geometries. However, the geometry constraints of the nuclear fuel formed by conventional methods may limit the manner in which the nuclear fuel mechanically interfaces with heat exchangers or power conversion mechanisms.

BRIEF SUMMARY

Embodiments disclosed herein include methods of additively manufacturing structures for a nuclear reactor, and to related nuclear fuels, fuel rods, and structures of a nuclear reactor. For example, in accordance with one embodiment, a method of forming a fuel rod for a nuclear reactor comprises disposing a powder comprising particles of a fuel material on a substrate, exposing the powder to energy from an energy source to form a first layer of a nuclear fuel, the first layer comprising inter-granular bonds between the particles of the fuel material, disposing additional powder comprising particles of the fuel material over the first layer of the nuclear fuel, and exposing the additional powder to energy from the energy source to form a second layer of the nuclear fuel and to form the nuclear fuel to have a void fraction greater than about 0.20, the second layer comprising inter-granular bonds between the additional powder and the first layer of the nuclear fuel.

In additional embodiments, a fuel rod comprising a porous nuclear fuel comprises a nuclear fuel having a porous structure having void fraction greater than about 0.10, and cladding disposed around the nuclear fuel.

DETAILED DESCRIPTION

Figure 1:
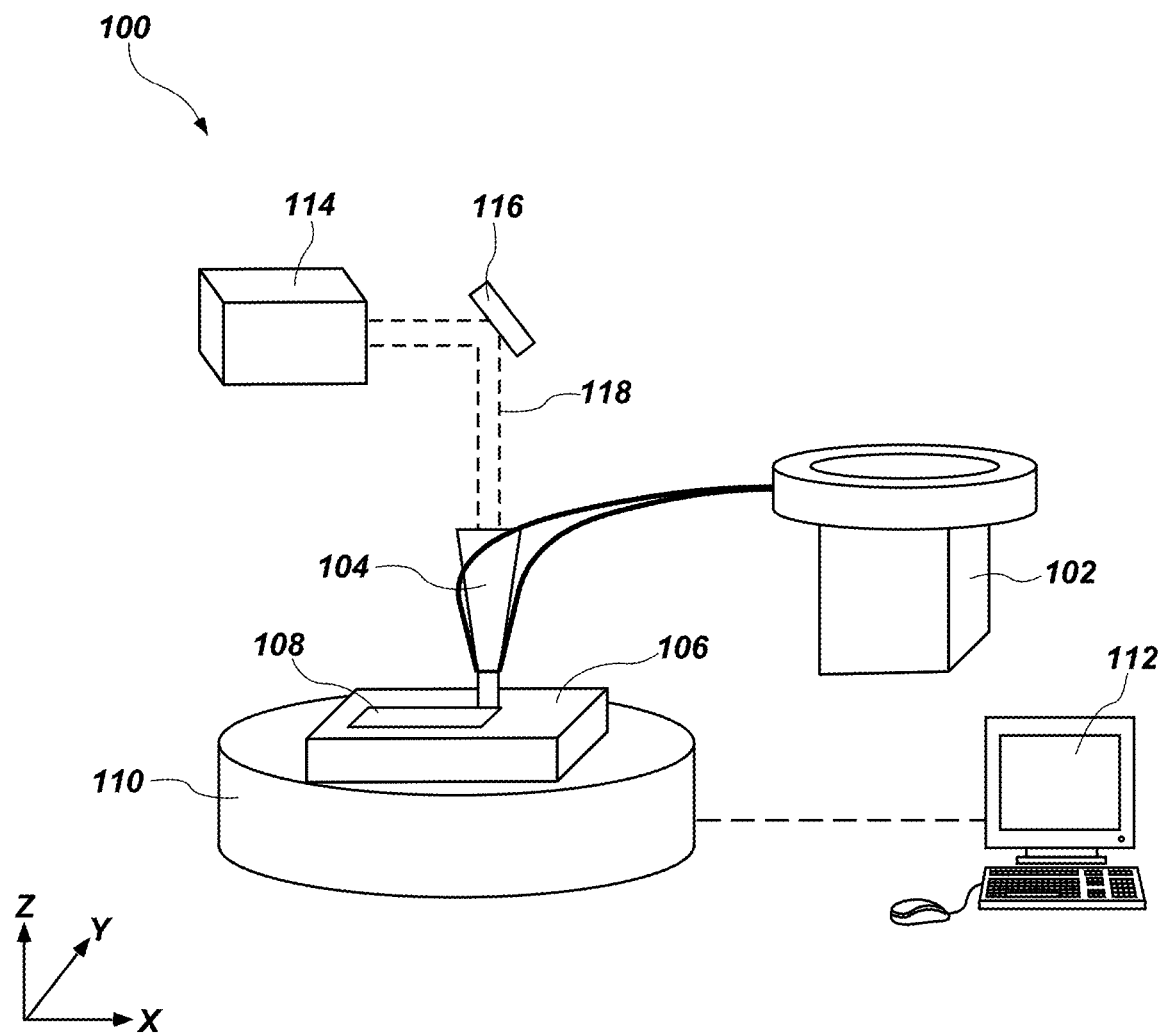
FIG. 1 is a simplified schematic of a system for additively manufacturing one or more components of a nuclear reactor, in accordance with embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a nuclear fuel element, a component of a nuclear reactor core, another structure, or related methods. Only those process acts and structures necessary to understand the embodiments of the disclosure are described in detail below. Additional acts to form a nuclear fuel element, a component of a nuclear reactor core, or another structure may be performed by conventional techniques. Further, any drawings accompanying the present application are for illustrative purposes only and, thus, are not drawn to scale. Additionally, elements common between figures may retain the same numerical designation.

As used herein, the term "metallic foam" means and includes a material comprising a metal component and exhibiting a void fraction (e.g., porosity) greater than about 0.10. Accordingly, metallic foam materials may not exhibit a full theoretical density.

According to embodiments described herein, a structure comprising one or more components of a nuclear reactor (e.g., one or more components of a nuclear reactor core, a nuclear fuel, cladding, a fuel rod, heat exchanger mechanisms associated with a nuclear reactor core, etc.) is formed layer by layer in an additive manufacturing process, which may also be characterized as a direct material deposition process. Since the structure is formed layer by layer, the structure may be formed to exhibit complex cross-sectional geometries, non-uniform external surface topographies, and compositional features that are unobtainable or difficult to manufacture according to conventional methods. In some embodiments, the structure is formed to exhibit a desired porosity, and a desired shape and size. In some embodiments, a nuclear fuel is formed to exhibit a porosity, which may facilitate accommodation of expansion (e.g., swelling) of the nuclear fuel during use and operation thereof in a nuclear reactor. In addition, the nuclear fuel may be formed to have a desired geometry, such as, for example, internal cooling channels, channels for coupling the nuclear fuel to a heat exchanger mechanism, etc. Since the nuclear fuel is formed layer by layer, the nuclear fuel may be formed to exhibit a compositional gradient along a length thereof (e.g., one or more layers of the nuclear fuel may exhibit a different composition than one or more other layers of the nuclear fuel), a compositional gradient along a radius thereof, or a combination thereof. In some embodiments, the nuclear fuel may include one or more dopants therein to increase a tensile strength of the nuclear fuel.

According to further embodiments, a fuel rod comprising the nuclear fuel and a cladding material may be formed by additive manufacturing. In some embodiments, the fuel rod may include a fission barrier, a reactor poison, or both. Since the fuel rod is formed by additive manufacturing, the fuel rod may be formed to exhibit a desired internal and external geometry. In some embodiments, a cross-sectional shape of the fuel rod may be selected to increase a thermal conductivity of the nuclear fuel to the cladding material. In some embodiments, the fuel rod may be formed to include channels in the nuclear fuel structure, the channels configured to receive a heat transfer fluid therein (e.g., air, water, etc.). In some embodiments, the fuel rod may be formed to exhibit a compositional gradient along a length thereof, along a radius thereof, or a combination thereof. In further embodiments, a portion of a reactor core may be formed by additive manufacturing.

After fabrication of the structure, at least a portion of the structure may be exposed to annealing conditions (e.g., hot isostatic pressing, spark plasma sintering, or one or more other densification processes) to densify at least a portion of the structure. In some embodiments, exposing the structure to annealing conditions may densify portions of the structure (e.g., cladding), while other portions thereof (e.g., the nuclear fuel) are substantially unaffected and not densified (e.g., remain porous). Since the cladding may exhibit a lower melting temperature than the nuclear fuel, the nuclear fuel may not be affected by exposure of the structure to the annealing conditions. In some such embodiments, the nuclear fuel may remain at a theoretical density less than a predetermined amount (e.g., less than about 90% theoretical density, less than about 80% theoretical density, less than about 70% theoretical density) while other portions of the structure (e.g., the cladding material) are densified to full density, a theoretical density greater than about 80%, greater than about 90%, greater than about 95%, greater than about 98%, or even greater than about 99%.

Referring to FIG. 1, a system 100 for additively manufacturing one or more components of a nuclear reactor is illustrated, in accordance with embodiments of the disclosure. The system 100 may be used to additively manufacture, for example, a nuclear fuel, a nuclear fuel surrounded by cladding, a fuel rod, other components of a nuclear reactor, or combinations thereof.

The system 100 includes a powder feed 102 comprising sources of one or more powder constituents used to form a product to be additively manufactured. The powder feed 102 may comprise particles of a nuclear fuel material, particles of a cladding material, particles of a nuclear reactor poison, particles of a fission barrier material, one or more dopants, particles of a heat exchange mechanism (e.g., particles of a heat pipe), another component of a nuclear reactor (e.g., particles making up one or more components of a nuclear reactor core), or combinations thereof.

By way of nonlimiting example, where the powder feed 102 comprises a nuclear fuel, the powder feed may include particles of uranium, zirconium, tungsten, tantalum, iridium, uranium dioxide ($UO_2$), uranium oxide (e.g., $U_3O_8$), uranium nitride (e.g., UN, $U_2N_3$, etc.), uranium borides (e.g., $UB_2$, $UB_4$), a transuranic material (e.g., plutonium, plutonium oxide), thorium, oxides thereof, another nuclear fuel material, or combinations thereof.

In some embodiments, the powder feed 102 comprises a mixture of uranium and at least one of zirconium, molybdenum, and tungsten. By way of nonlimiting example, the powder feed 102 may comprise uranium and zirconium and may include between about 1.0 weight percent and about 15.0 weight percent uranium (e.g., between about 1.0 weight percent and about 5.0 weight percent, between about 5.0 weight percent and about 10.0 weight percent, or between about 10.0 weight percent and about 15.0 weight percent uranium) and between about 85.0 weight percent and about 99.0 weight percent zirconium (e.g., between about 85.0 weight percent and about 90.0 weight percent, between about 90.0 weight percent and about 95.0 weight percent, or between about 95.0 weight percent and about 99.0 weight percent zirconium). In some embodiments, the powder feed 102 may comprise about 10.0 weight percent uranium and about 90.0 weight percent zirconium to form a nuclear fuel comprising about 10.0 weight percent uranium and about 90.0 weight percent zirconium which may be referred to as U-10Zr fuel.

Where the powder feed 102 includes particles of a cladding material, the powder feed 102 may include particles of zirconium, a stainless steel alloy (e.g., 316 stainless steel), nickel, iron, chromium, molybdenum, titanium, tungsten, or combinations thereof.

Where the powder feed 102 includes particles of a fission barrier material, the powder feed 102 may include particles of zirconium, vanadium, another material, or combinations thereof.

In some embodiments, the powder feed 102 includes one or more dopants with which a nuclear fuel material may be mixed. By way of nonlimiting example, the dopants may include a metal oxide (aluminum oxide, zirconium oxide, etc.), carbon nanotubes, carbon nanotubes coated with a metal oxide (e.g., aluminum oxide, zirconium oxide, another metal oxide, or combinations thereof), another material, or combinations thereof. In some embodiments, the dopant may facilitate improved tensile strength of a structure formed from the powder feed 102. In some embodiments, coating carbon nanotubes with a metal oxide may improve a wetting angle of the coated carbon nanotubes and may improve emulsification of the coated carbon nanotubes in a metal phase during sintering of the carbon nanotubes in a metal fuel network. As will be described herein, the one or more dopants may increase a tensile strength of a nuclear fuel including the one or more dopants.

Of course, the powder feed 102 may include other materials. In some embodiments, the powder feed 102 includes one or more burnable poison materials, such as boron, gadolinium, $Gd_2O_3$, $B_4C$, etc., another material exhibiting a high thermal neutron absorption cross-section, and combinations thereof. In other embodiments, the powder feed 102 includes poisons such as krypton, molybdenum, neodymium, hafnium, another neutron absorber, or combinations thereof. In some embodiments, the powder feed 102 includes at least some particles of a nuclear fuel (e.g., uranium, uranium oxide, uranium dioxide, uranium nitrides, uranium borides, a transuranic material, etc.) coated with a layer of the burnable poison.

In yet other embodiments, the powder feed 102 includes one or more materials for forming a neutron reflector. In some such embodiments, the powder feed 102 includes, for example, particles of beryllium, particles of graphite, another material exhibiting a sufficient neutron reflectivity, or combinations thereof.

In some embodiments, the powder feed 102 is in fluid communication with a powder delivery nozzle 104. The powder feed 102 may be provided to the powder delivery nozzle 104 as a mixture having a desired composition. In other embodiments, the powder may be provided to the powder delivery nozzle 104 as separate components (e.g., zirconium and uranium) that are mixed at the powder delivery nozzle 104.

The powder delivery nozzle 104 may be positioned and configured to deliver the powder feed 102 to a surface of a substrate 106 on which a structure 108 is formed. The powder delivery nozzle 104 may be configured to deliver more than one powder feed 102 composition to the substrate 106 concurrently. In other words, the powder delivery nozzle 104 may be in fluid communication with powders having more than one composition and may be used to form the structure 108 having one or more different composition therethrough. Accordingly, although only one powder delivery nozzle 104 is illustrated in FIG. 1, in some embodiments, the system 100 includes more than one powder delivery nozzle 104, each powder delivery nozzle 104 in fluid communication with a powder feed 102 having a different composition than the other powder delivery nozzles 104. By way of nonlimiting example, in some embodiments, the system 100 includes a powder delivery nozzle 104 in fluid communication with a powder feed 102 comprising a nuclear fuel material, a powder delivery nozzle 104 in fluid communication with a powder feed 102 comprising a cladding material, a powder delivery nozzle 104 in fluid communication with a powder feed 102 comprising a fission barrier material, and a powder delivery nozzle 104 in fluid communication with a powder feed 102 comprising a poison material.

In other embodiments, the powder delivery nozzle 104 may be in fluid communication with a plurality of powder feed 102 materials. In some such embodiments, the powder delivery nozzle 104 is configured to receive powder from different powder feed 102 materials and configured to dispose powders of different compositions on the substrate 106.

The substrate 106 and the structure 108 are disposed on a table 110, which may comprise, for example, a triaxial numerical control machine. Accordingly, the table 110 may be configured to move along at least three axes. By way of nonlimiting example, the table 110 may be configured to move in the x-direction (i.e., left and right in the view illustrated in FIG. 1), the y-direction (i.e., into and out of the page in the view illustrated in FIG. 1), and the z-direction (i.e., up and down in the view illustrated in FIG. 1).

The table 110 may be operably coupled with a central processing unit 112 configured to control the table 110. In other words, movement of the table 110 may be controlled through the central processing unit 112, which may comprise a control program for a processor including operating instructions for movement of the table 110.

The system 100 may further include an energy source 114 configured to provide energy to the powder on the substrate 106. Energy (e.g., electromagnetic energy) from the energy source 114 may be directed to the substrate 106 and the structure 108 through a mirror 116, which may orient the energy to the substrate 106. The energy source 114 may comprise, for example, a laser (e.g., selective laser additive manufacturing), an electron beam, a source of microwave energy, or another energy source. In some embodiments, powder from the powder delivery nozzle 104 is disposed on the substrate 106 and simultaneously exposed to energy (illustrated by broken lines 118) from the energy source 114.

Although FIG. 1 illustrates that the table 110 is operably coupled with the central processing unit 112 to effect movement of table 110, the disclosure is not so limited. In other embodiments, the central processing unit 112 is operably coupled with the powder delivery nozzle 104 and the energy source 114 and the powder delivery nozzle 104 and the energy source 114 is configured to move in one or more directions (e.g., the x-direction, the y-direction, and the z-direction) responsive to receipt of instructions from the central processing unit 112. In some such embodiments, one or some of the powder delivery nozzle 104, the energy source 114 and the table 110 may be configured to move in one or more directions. Movement of the powder delivery nozzle 104, the energy source 114, the table 110, or both may facilitate forming the structure 108 to have a desired composition and geometry.

In use and operation, a layer of powder from the powder feed 102 and expelled by the powder delivery nozzle 104 may be formed over the substrate 106 and subsequently exposed to energy from the energy source 114 to form inter-granular bonds between particles of the layer of powder. In other embodiments, the powder is exposed to energy from the energy source 114 substantially simultaneously with delivery of the powder to the surface of the substrate 106 or substantially immediately thereafter. In some such embodiments, portions of the layer of the structure 108 being formed may be exposed to energy from the energy source 114 prior to formation of the entire layer of the structure 108. At least one of the energy source 114 and the table 110 may be configured to move responsive to instructions from the central processing unit 112.

After formation of the layer of the structure 108, the substrate 106 is moved away from the energy source 114, such as by movement of one or both of the table 110 and the energy source 114 responsive to receipt of instructions from the central processing unit 112. Additional powder may be delivered to the surface of the previously formed layer of the structure 108 in a desired pattern and exposed to energy from the energy source 114 to form inter-granular bonds between adjacent particles of the powder in the layer and between particles of the powder in the layer and the underlying layer of the structure 108.

Each layer of the structure 108 may be between about 25 μm (about 0.001 inch) and about 500 μm (about 0.020 inch), such as between about 25 μm and about 50 μm, between about 50 μm and about 100 μm, between about 100 μm and about 200 μm, between about 200 μm and about 300 μm, between about 300 μm and about 400 μm, or between about 400 μm and about 500 μm. Accordingly, the structure 108 may be formed one layer at a time, each layer having a thickness between about 25 μm and about 500 μm.

In some embodiments, one or more layers of the structure 108 may be formed to exhibit a different composition than one or more other layers of the structure 108. In some embodiments, different portions of a single layer of the structure 108 may exhibit a different composition than other portions of the same layer of the structure 108. By way of nonlimiting example, where the structure 108 comprises a fuel rod, a portion (i.e., a central portion) of the layer may comprise a nuclear fuel (e.g., uranium oxide) and a portion (i.e., a peripheral portion) of the layer may comprise a cladding material. Where the structure 108 comprises a portion of a reactor core, portions of the layer may comprise a fuel rod and other portions of the layer may comprise a reactor poison.

In some embodiments, the structure 108, or at least a portion thereof, may be formed to exhibit a void fraction (e.g., porosity) between about 0.10 and about 0.50, such as between about 0.10 and about 0.20, between about 0.20 and about 0.30, between about 0.30 and about 0.40, or between about 0.40 and about 0.50. In some such embodiments, the structure 108 may not be formed to a full theoretical density thereof. As will be described herein, forming the structure 108 to exhibit a void fraction may facilitate expansion of the structure 108 during use thereof in a nuclear reactor. By way of nonlimiting example, a nuclear fuel may be formed to exhibit a void fraction according to the methods described herein.

In some embodiments, a nuclear fuel exhibiting a void fraction between about 0.10 and about 0.50, as described above, may be formed by additive manufacturing. The nuclear fuel may be used in a fuel rod in, for example, a fast-neutron reactor, a light water reactor, a modular nuclear reactor, a space reactor, a micro reactor, or other nuclear reactor.

Figure 2A:
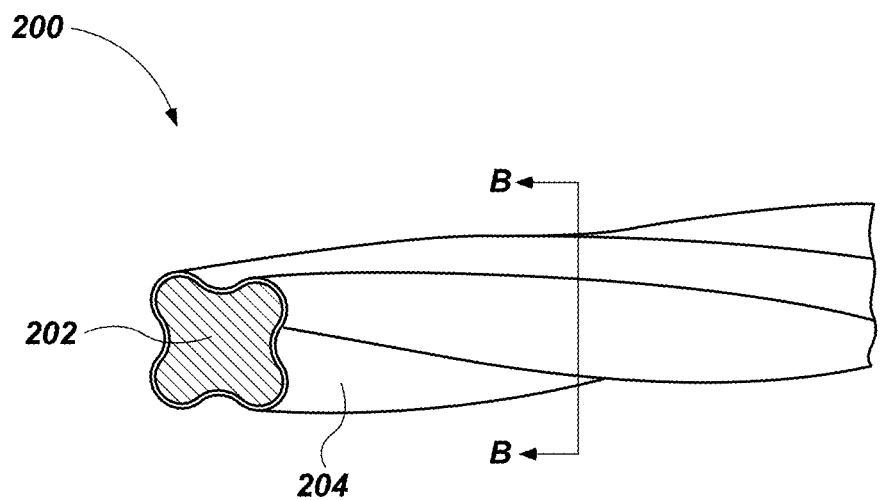
FIG. 2A and FIG. 2B are a respective simplified perspective view and a cross-sectional view of a fuel rod formed according to the methods described herein, in accordance with embodiments of the disclosure.
Figure 2B:
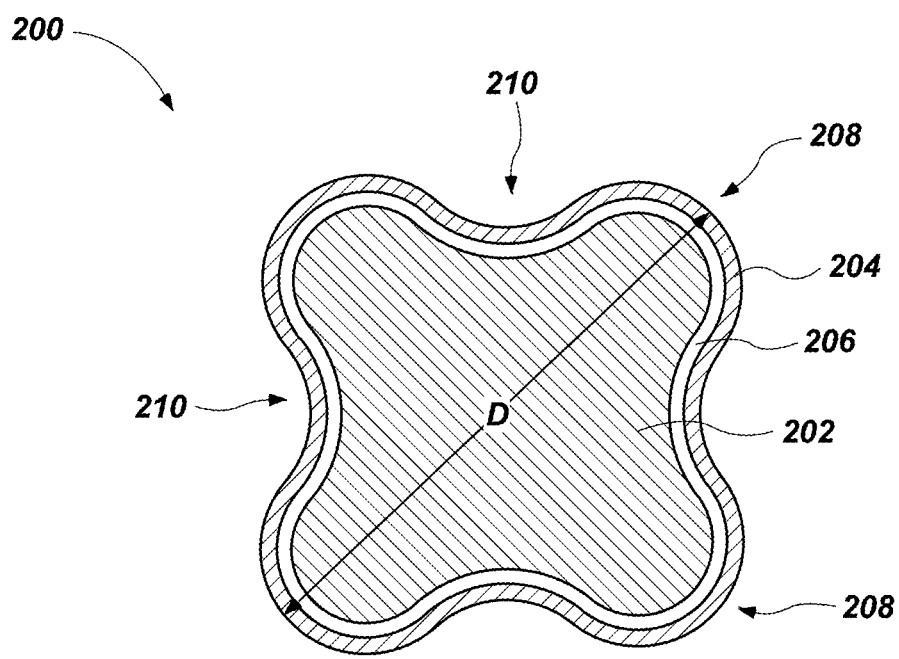

FIG. 2A and FIG. 2B are a respective simplified perspective view and a cross-sectional view of a fuel rod 200 formed according to the methods described herein, in accordance with embodiments of the disclosure. The fuel rod 200 includes a nuclear fuel 202 surrounded by cladding 204. A fission barrier material 206 may be disposed between the nuclear fuel 202 and the cladding 204. In some embodiments, the fission barrier material 206 may substantially conformally overlie the nuclear fuel material 202. In some such embodiments, the fission barrier material 206 may have substantially the same cross-sectional shape as the nuclear fuel material 202. Similarly, the cladding 204 may substantially conformally overlie the fission barrier material 206 and may have substantially the same cross-sectional shape as the nuclear fuel material 202 and the fission barrier material 206.

The nuclear fuel 202 may include any suitable nuclear fuel. In some embodiments, the nuclear fuel 202 comprises uranium dispersed in zirconium (e.g., U-10Zr (an alloy of uranium and about 10 weight percent zirconium)). The nuclear fuel 202 may comprise a metallic foam and may exhibit a void fraction between about 0.10 and about 0.50, as described above. In some embodiments, the void fraction of the nuclear fuel 202 may be greater than about 0.10, greater than about 0.20, greater than about 0.30, greater than about 0.40, or even greater than about 0.50. In some such embodiments, the nuclear fuel 202 may exhibit a theoretical density less than about 100%, such as less than about 95%, less than about 90%, less than about 85%, less than about 80%, or even less than about 70%.

In some embodiments, a composition of the nuclear fuel 202 varies with a distance (e.g., a radial distance) from a center of the fuel rod 200. By way of nonlimiting example, an enrichment of the nuclear fuel 202 may increase with an increasing distance from a center of the nuclear fuel 202 and may decrease with a distance from the cladding 204. In other words, the enrichment of the nuclear fuel 202 may be greater proximate the cladding 204 than proximate a center of the nuclear fuel 202. In other embodiments, the enrichment of the nuclear fuel 202 may be less proximate the cladding 204 than proximate the center of the nuclear fuel 202. Forming the nuclear fuel 202 by additive manufacturing may facilitate forming the nuclear fuel 202 to exhibit a varying amount of enrichment with varying distance from a center thereof.

In some embodiments, a composition of the nuclear fuel 202 may vary along a length of the fuel rod 200. By way of nonlimiting example, the nuclear fuel 202 may exhibit a greater amount of enrichment at a top and bottom of the fuel rod 200 than at a longitudinally central portion of the fuel rod 200. Forming the nuclear fuel 202 by additive manufacturing and layer by layer may facilitate forming the nuclear fuel 202 to exhibit a varying enrichment along a longitudinal axis thereof.

In some embodiments, the nuclear fuel 202 may include one or more dopants, such as one or more of a metal oxide (aluminum oxide, zirconium oxide, etc.), carbon nanotubes, carbon nanotubes coated with a metal oxide (e.g., aluminum oxide, zirconium oxide, another metal oxide, or combinations thereof), another material, or combinations thereof. In some embodiments, the dopant may facilitate improved tensile strength of the nuclear fuel 202. The nuclear fuel 202 including the one or more dopants therein may be formed by additive manufacturing with a powder comprising the nuclear fuel and the one or more dopants dispersed therein.

The cladding 204 may comprise stainless steel (e.g., austenitic 304 stainless steel, 316 stainless steel, HT-9 stainless steel (a ferritic steel comprising about 12.3 weight percent chromium, about 0.5 weight percent nickel, about 1.0 weight percent molybdenum, about 0.01 weight percent copper, about 0.3 weight percent vanadium, about 0.47 weight percent vanadium, the remainder comprising carbon, manganese, phosphorus), stainless steels including alloys of chromium and nickel), an oxide dispersion-strengthened alloy (ODS) including one or more nickel-based alloys, iron-based alloys, and aluminum-based alloys such as, for example, iron aluminide, iron chromium, iron-chromium-aluminum, nickel chromium, and nickel aluminide, a nano-ferritic alloy (NFA), a zirconium-based alloy, another material, or combinations thereof. A thickness of the cladding 204 may be between about 0.5 µm and about 800 µm, such as between about 0.5 µm and 1.0 µm, between about 1.0 µm and about 5.0 µm, between about 5.0 µm and about 25 µm, between about 25 µm and about 50 µm, between about 50 µm and about 100 µm, between about 100 µm and about 250 µm, between about 250 µm and about 500 µm, or between about 500 µm and about 800 µm.

Forming the fuel rod 200 to comprise the cladding 204 and the nuclear fuel 202 concurrently may reduce thermal contact resistance between the cladding 204 and the nuclear fuel 202.

The fission barrier material 206 may comprise zirconium, vanadium, another material, and combinations thereof. In some embodiments, the fission barrier material 206 is substantially free of pinholes such that fission products do not substantially diffuse from the nuclear fuel material 202 through the fission barrier material 206 and to the cladding 204. In some such embodiments, the fission barrier material 206 is hermetically disposed around the nuclear fuel material 202. Accordingly, the fission barrier material 206 may impede or reduce so-called fuel-cladding mechanical and chemical interactions (FCCI). By way of contrast, conventional fission barrier materials formed by atomic layer deposition or chemical vapor deposition and may include holes or deformities through which fission products may propagate. Alternatively, fission barrier products may be formed with a foil that lines the fuel material, however the foil may unwrap during fabrication of the fuel element associated with the foil. Without wishing to be bound by any particular theory, it is believed that forming the fission barrier material 206 around the nuclear fuel material 202 by additive manufacturing may facilitate a fission barrier material hermetically disposed around the nuclear fuel material 202 and may reduce a likelihood of diffusion of fission products through the fission barrier material 206.

A thickness of the fission barrier material 206, exaggerated in the view of FIG. 2B for clarity, may be between about 0.5 µm and about 500 µm, such as between about 0.5 µm and about 5.0 µm, between about 5.0 µm and about 25 µm, between about 25 µm and about 50 µm, between about 50 µm and about 100 µm, between about 100 µm and about 250 µm, or between about 250 µm and about 500 µm.

In some embodiments, an interface between the fission barrier material 206 and each of the nuclear fuel 202 and the cladding 204 may comprise a gradient. In some such embodiments, an atomic percent of components of the fission barrier material 206 (e.g., vanadium, zirconium, etc.) may increase from a location proximate the nuclear fuel material 202 to a location at a radially central portion of the fission barrier material 206. An atomic percent of the components of the fission barrier material 206 may decrease from a location proximate the radially central portion of the fission barrier material 206 to a location proximate the cladding 204. In some embodiments, the atomic percent of the components of the fission barrier material 206 may not be uniform and may vary with a distance from the center of the fuel rod 200.

Referring to FIG. 2B, the fuel rod 200 may include lobes 208 and corresponding valleys 210 between adjacent lobes 208. The lobes 208 may protrude further from a center of the fuel rod 200 than the valleys 210. The lobes 208 and the valleys 210 may increase an exposed surface area of the fuel rod 200 for a given cross-sectional area of the fuel rod 200 and may improve heat transfer between the fuel rod 200 and fluids surrounding the fuel rod 200 in use and operation of a nuclear reactor including the fuel rod 200. Accordingly, along a length of the fuel rod 208, 200 the valleys 210 and lobes 208 may define a volume through which a cooling fluid (e.g., air) may flow during use and operation of the fuel rod 200 in a nuclear reactor.

Referring to FIG. 2A, the fuel rod 200 may twist, for example in a helical configuration, along a longitudinal axis thereof. In other words, along the longitudinal axis of the fuel rod 200, the locations of the lobes 208 and the valleys 210 may rotate. In some such embodiments, the fuel rod 200 may include a helical gaseous heat exchange structure. In some such embodiments, the fuel rod 200 may be additively manufactured by forming at least one layer of the fuel rod 200 on an adjacent layer, the at least one layer rotated (with respect to a longitudinal axis) relative to the adjacent layer. In other words, the at least one layer may, for example, have a same cross-sectional shape as the adjacent layer, but may be rotated (e.g., by about 1°, by about 2°, by about 5°, by about 10°, by about 15°) with respect to the adjacent layer. In some such embodiments, the at least one layer may be said to be rotationally offset with respect to the adjacent layer.

Although FIG. 2B illustrates that the fuel rod 200 includes four lobes 208, the disclosure is not so limited. In other embodiments, the fuel rod 200 includes fewer lobes 208 (e.g., three lobes) or a greater number of lobes 208 (e.g., five lobes, six lobes, seven lobes, eight lobes, etc.).

A distance D between an exterior surface of a lobe 208 to an exterior surface of an opposing lobe 208 may be between about 0.25 cm to about 1.0 cm, such as between about 0.25 cm and about 0.35 cm, between about 0.35 cm and about 0.5 cm, between about 0.5 cm and about 0.75 cm, or between about 0.75 cm and about 1.0 cm. In some embodiments, the distance D is equal to about 0.635 cm (about 0.25 inch).

In some embodiments, the fuel rod 200 may include one or more neutron reflector materials. By way of nonlimiting example, the fuel rod 200 may include a neutron reflector material at a top thereof, at a bottom thereof, or both. The neutron reflector material may include beryllium, graphite, another material, or combinations thereof. In some embodiments, the neutron reflector material may be formed by the additive manufacturing process. By way of nonlimiting example, a layer of the neutron reflector material may be formed by additive manufacturing, layers of the nuclear fuel 202 and cladding 204 may be formed by additive manufacturing, and additional layers of the neutron reflector material may be formed by additive manufacturing over the layers of the nuclear fuel 202 and the cladding 204.

Figure 2C:
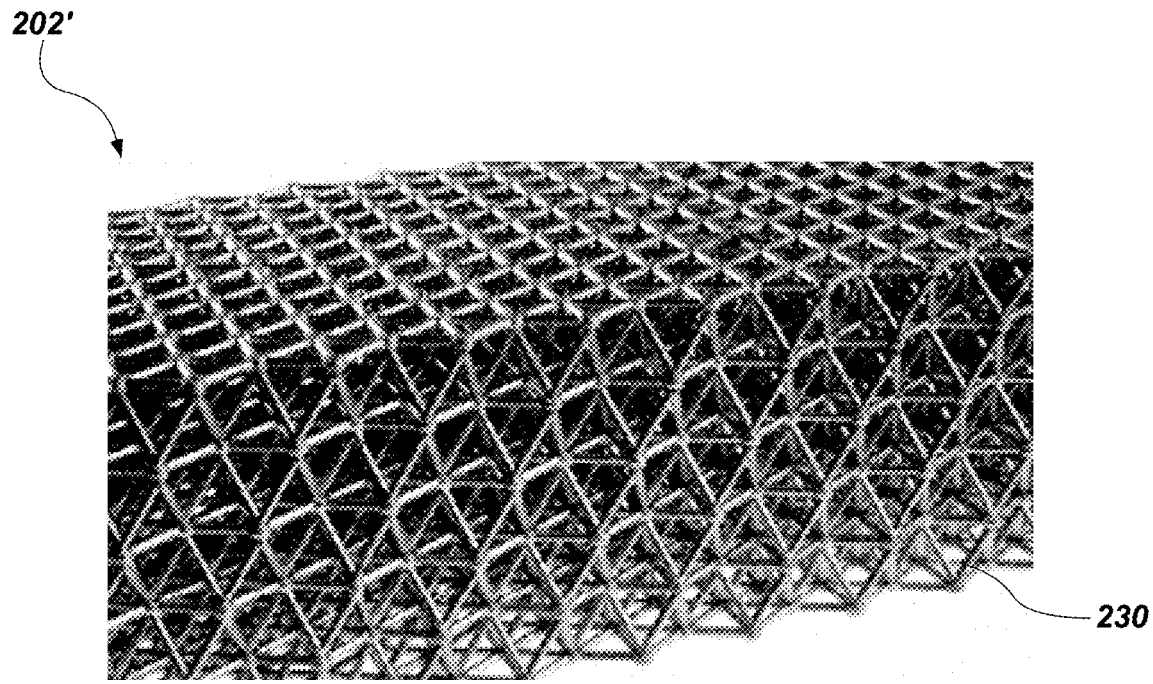
FIG. 2C is a perspective view of nuclear fuel illustrating a geometry of the nuclear fuel, in accordance with embodiments of the disclosure.

In some embodiments, the nuclear fuel 202 includes one or more grids, one or more tetrahedra, or a combination thereof within the nuclear fuel 202 to improve mechanical stability of the nuclear fuel 202 during irradiation and fission. FIG. 2C is a perspective view of nuclear fuel 202' including support structures 230 having a tetrahedral shape. The support structures 230 may comprise any of the nuclear fuels described above, such as, for example, uranium, uranium oxide, uranium dioxide, uranium nitrides, uranium borides, a transuranic material, thorium, oxides, thereof, or another nuclear fuel.

Figure 2D:
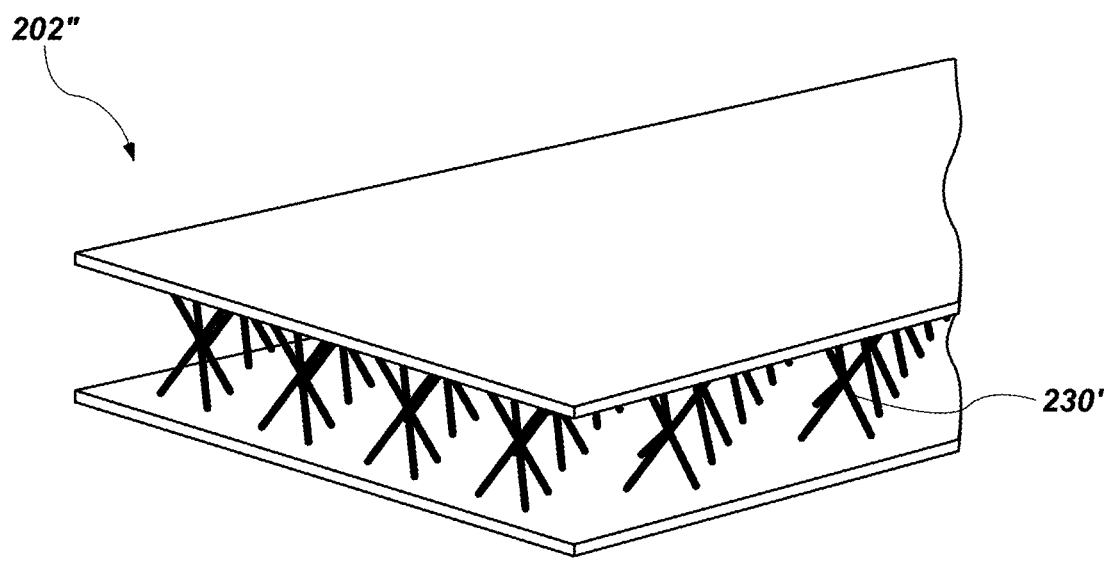
FIG. 2D is a perspective view of a nuclear fuel illustrating a geometry of the nuclear fuel, in accordance with other embodiments of the disclosure.

FIG. 2D is a perspective view of a nuclear fuel 202", in accordance with other embodiments of the disclosure. The nuclear fuel 202" includes support structures 230' extending throughout a body of the nuclear fuel 202". The support structures 230' may include a nuclear fuel, as described above with reference to the support structure 230 (FIG. 2C). In some embodiments, spaces between the support structures 230, 230' may be void and the nuclear fuel 202', 202" may comprise a porous nuclear fuel.

In addition, compartmentalization of the fissile materials with high temperature refractory metal oxides such as zirconium oxide and refractory metals such as molybdenum, tungsten, chromium, vanadium, tantalum, rhenium, hafnium, titanium, or other refractory metal may further impede creep (e.g., slump) during high temperature excursions, power excursions, or both. In other words, forming the nuclear fuels 202, 202', 202" to include high temperature refractory metal oxides and refractor metals may improve operating properties of corresponding fuel rods, such as by reducing or impeding creep during high temperature excursions, power excursions, or both.

Figure 3:
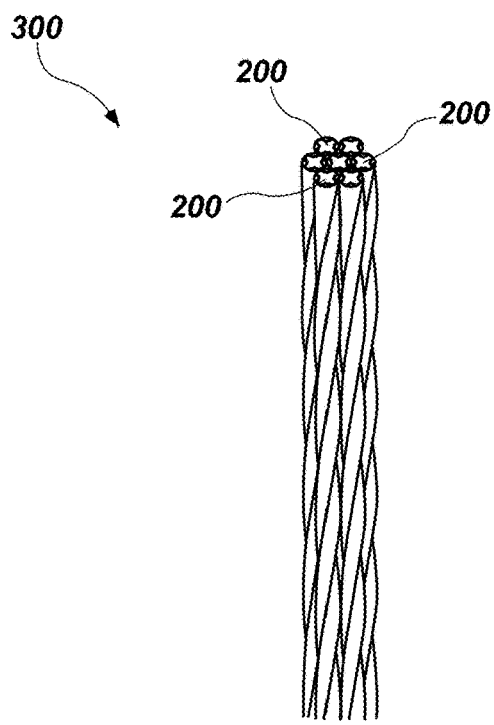
FIG. 3 is a simplified perspective view of fuel rods assembled in a bundle, in accordance with embodiments of the disclosure.

FIG. 3 is a simplified perspective view of multiple fuel rods 200 arranged in a bundle 300, in accordance with embodiments of the disclosure. As illustrated in FIG. 3, the shape of the fuel rods 200 may facilitate an increased packing density of the fuel rods 200 in the bundle 300. In some embodiments, a lobe 208 (FIG. 2B) of one fuel rod 200 may be disposed in a valley 210 (FIG. 2B) of an adjacent fuel rod 200.

Figure 4:
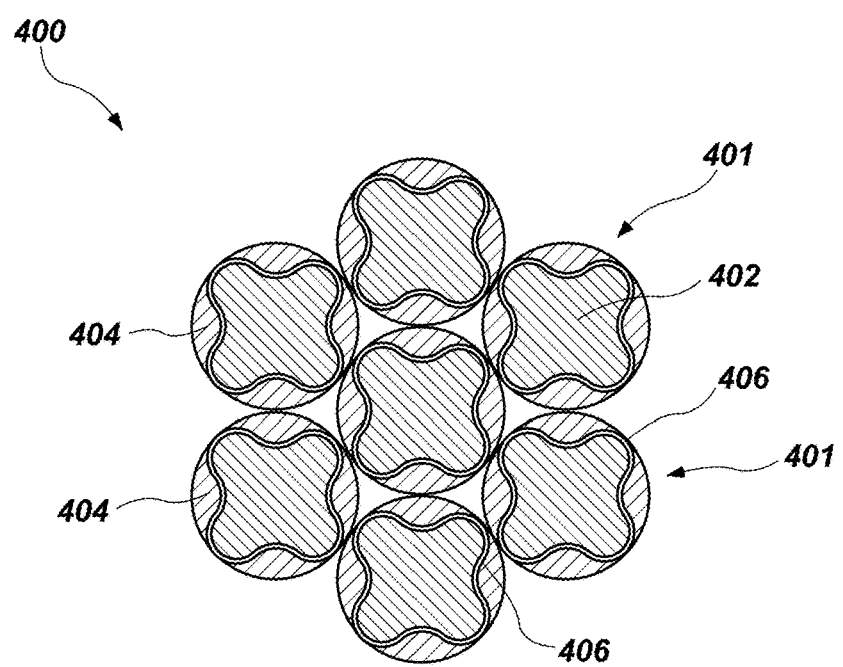
FIG. 4 is a cross-sectional view of a bundle of fuel rods, in accordance with other embodiments of the disclosure.

FIG. 4 is a cross-sectional view of a bundle 400 of fuel rods 401, in accordance with other embodiments of the disclosure. The fuel rods 401 include a nuclear fuel material 402 surrounded by a cladding material 404. In some embodiments, a fission barrier material 406 may intervene between the nuclear fuel material 402 and the cladding material 404, as described above with reference to the fuel rod 200 (FIG. 2A and FIG. 2B). The fuel rods 401 may have a cylindrical shape with a circular cross-sectional shape. The nuclear fuel material 402 may have a same cross-sectional shape as described above with reference to the nuclear fuel material 202 (FIG. 2A and FIG. 2B). The fission barrier material 406 may be conformally disposed around a periphery of the nuclear fuel material 402. In other embodiments, the fission barrier material 406 may be disposed around an inner surface of the cladding 404. The fission barrier material 406 may reduce or prevent chemical interactions between the nuclear fuel material 402 and the cladding 404 and may reduce or prevent stress corrosion cracking of the cladding 404.

The cladding 404 may be disposed around the fission barrier material 406. The cladding 404 may have a circular outer circumference. Accordingly, the fuel rod 401 may include a nuclear fuel material 402 having a different cross-sectional shape than the cross-sectional shape of the cladding 404.

Figure 5:
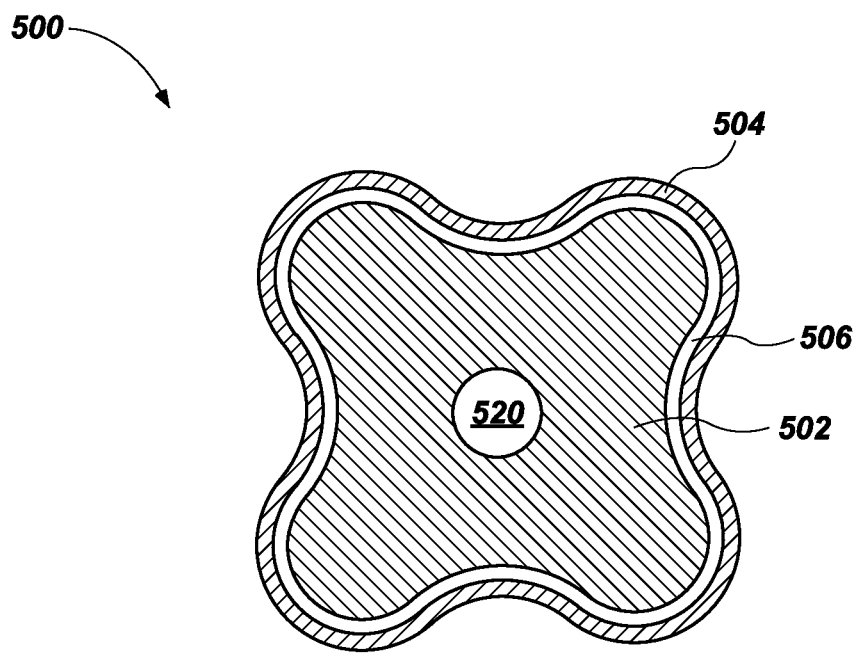
FIG. 5 is a simplified cross-sectional view of a fuel rod, in accordance with embodiments of the disclosure.

FIG. 5 is a simplified cross-sectional view of a fuel rod 500, in accordance with embodiments of the disclosure. The fuel rod 500 includes a nuclear fuel material 502 and cladding 504 surrounding the nuclear fuel material 502. The nuclear fuel material 502 and the cladding 504 may include the same materials described above with reference to the nuclear fuel material 202 and the cladding 204. In some embodiments, the fuel rod 500 includes a fission barrier material 506, which may include the same materials described above with reference to the fission barrier material 206.

The fuel rod 500 may include an aperture 520 extending through a central axis thereof. The aperture 520 may be defined by a circular cross-sectional shape. The aperture 520 may extend along a length of the fuel rod 500. In some embodiments, a heat transfer fluid (e.g., water, a vapor, etc.) may be flowed through the aperture 520 during use and operation of a nuclear reactor including the fuel rod 500 to recover heat from the fuel rod 500. In some embodiments, the aperture 520 may be configured to receive a heat pipe for recovering thermal energy from the fuel rod 500 and transferring the thermal energy to another portion of a nuclear reactor associated with the fuel rod. In some embodiments, a heat pipe may be formed by additive manufacturing concurrently with forming the fuel rod 500. Although FIG. 5 illustrates that the aperture 520 has a circular cross-sectional shape, the disclosure is not so limited. In other embodiments, the aperture 520 has a different cross-sectional shape, such as elliptical, oval, square, rectangular, triangular, hexagonal, or another shape.

Although FIG. 5 illustrates that the cladding 504 has the same cross-sectional shape as the nuclear fuel material 502, the disclosure is not so limited. In other embodiments, an outer surface of the cladding 504 may have a circular cross-sectional shape, as described above with reference to the cladding 404 (FIG. 4).

Figure 6:
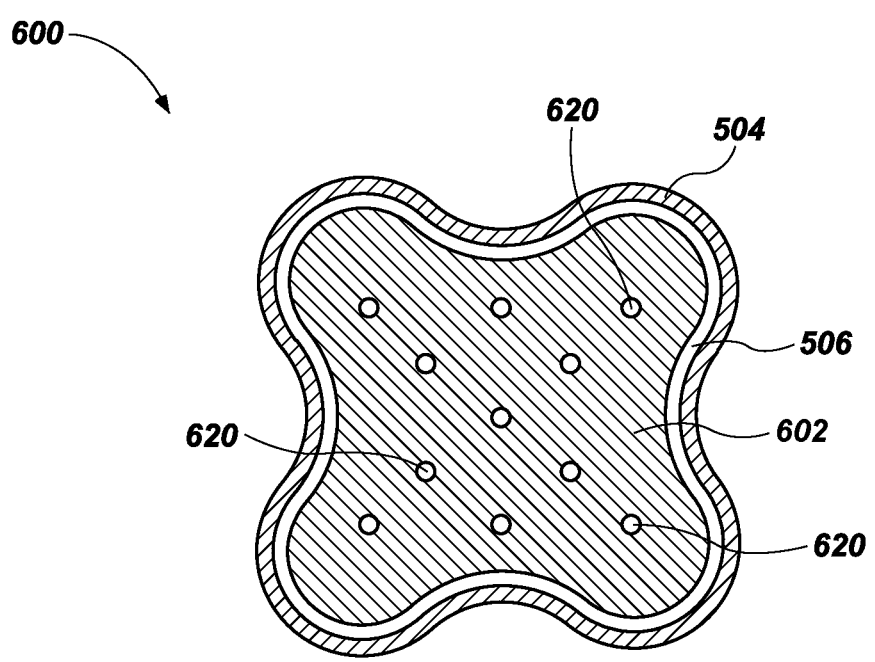
FIG. 6 is a simplified cross-sectional view of a fuel rod, in accordance with embodiments of the disclosure.

FIG. 6 is a simplified cross-sectional view of a fuel rod 600, in accordance with embodiments of the disclosure. The fuel rod 600 may be substantially the same as the fuel rod 500 (FIG. 5), except that the fuel rod 600 may include multiple apertures 620 extending therethrough. The apertures 620 may define flow channels sized and shaped to receive a heat transfer fluid, such as water or air, during use and operation of the fuel rod 600. In use and operation, the heat transfer fluid may be flowed through the apertures 620 for transferring thermal energy from the nuclear fuel material 602 to the heat transfer fluid and to other portions of a nuclear reactor core associated with the nuclear reactor core.

In some embodiments, a nuclear reactor core may comprise a bundle of fuel rods, such as the fuel rods 200, 500, 600 described above. In some embodiments, a poison rod comprising a burnable poison may be disposed in the bundle at desired axial and radial locations. Accordingly, a bundle may comprise fuel rods and at least one poison rod. The poison rods may include burnable poison materials, such as boron, gadolinium, $Gd_2O_3$, $B_4C$, etc., another material exhibiting a high thermal neutron absorption cross-section, and combinations thereof. The poison rods may be formed by additive manufacturing processes. In some such embodiments, the nuclear reactor core may be formed by additive manufacturing. By way of nonlimiting example, layers of the nuclear reactor core, at least some of the layers (e.g., each layer) comprising materials of the fuel rod (e.g., the nuclear fuel, cladding, and the diffusion barrier material) and materials of the burnable poison may be formed one over the other by additive manufacturing until a nuclear reactor core having a desired size and shape is formed. Similarly, burnable poisons may be layered over individual particles of fuel embedded within the fuel matrix of the nuclear fuels described above. In some such embodiments, the powder feed 102 (FIG. 1) may comprise at least some particles comprising the nuclear fuel material coated with a layer of a burnable poison. By way of nonlimiting example, the burnable poison may be formed over the particles of the fuel material by atomic layer deposition (ALD), chemical vapor deposition (CVD), physical vapor deposition (PVD), another deposition method, or combinations thereof.

Figure 7:
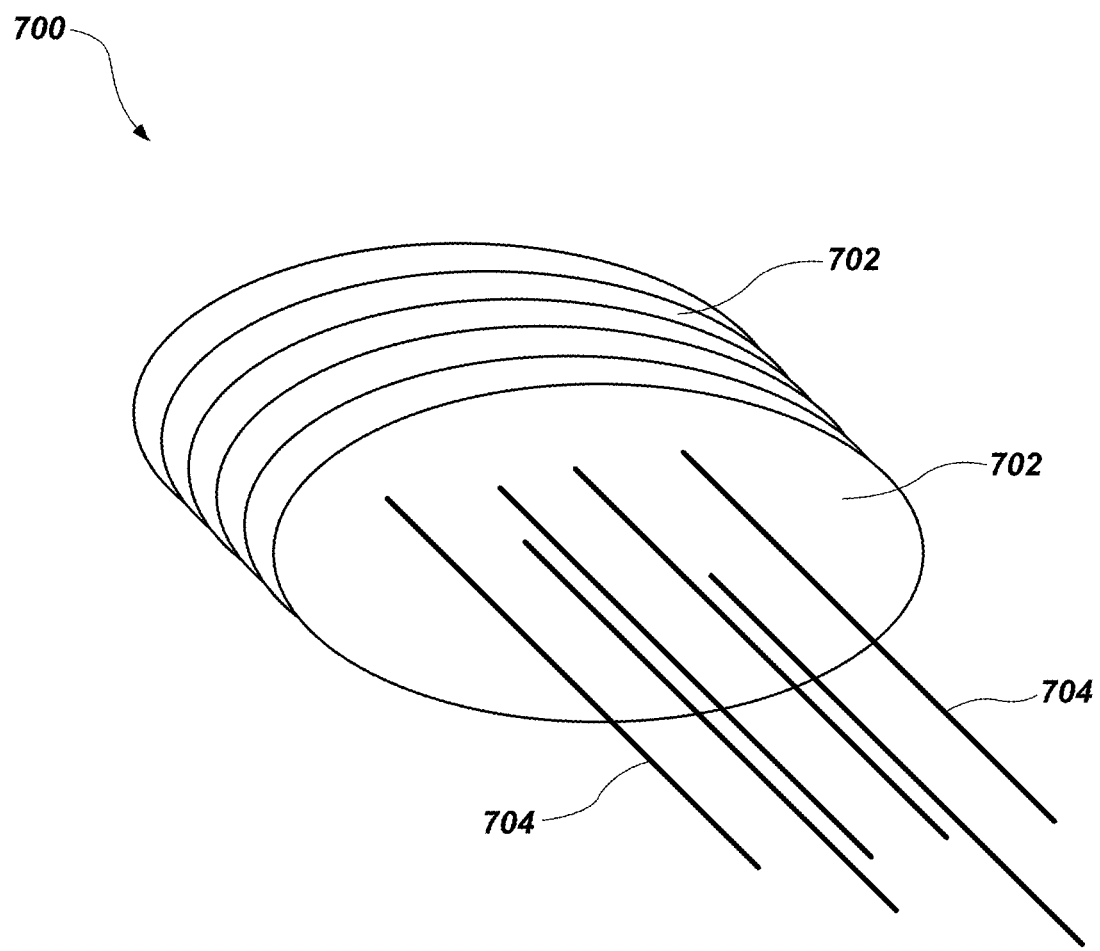
FIG. 7 is a simplified perspective view of an assembly comprising plates that may comprise a portion of a reactor core.

In some embodiments, a nuclear reactor core may be assembled from individual plates produced using additive manufacturing techniques. Referring to FIG. 7, an assembly 700 comprising heat plates 702 stacked in an arrangement that may comprise a portion of a reactor core. The heat plates 702 may comprise a suitable material, such as stainless steel (e.g., 304 stainless steel), zirconium, or another material. The plates may include mechanical interfaces for a heat exchange structure 704, such as a heat exchangers, a heat pipes, or a combination thereof. The heat exchange structures 704 may extend through the heat plates 702. The heat exchange structure 704 may extend from the reactor core proximate a nuclear fuel material to another portion of a nuclear reactor and may be configured for transferring heat from the nuclear fuel to the another portion of a nuclear reactor. In some embodiments, the heat plates 702 are substantially the same and comprise substantially the same geometry. In other words, the heat exchange structure 704 may extend through each heat plate 702 at substantially the same locations on the respective heat plate 702. Stacking of the individual plates in a critical assembly allows a reactor core to be constructed. Although not illustrated in FIG. 7, fuel rods (e.g., the fuel rods 200, 401, 500, 600) described above with reference to FIG. 2A through FIG. 6 may extend through one or more of the heat plates 702. In some embodiments, the assembly 700 may be formed in an additive manufacturing process such that the assembly 700 is formed and arranged (e.g., the heat plates 702 are stacked with the heat exchange structure 704 and fuel rods extending therethrough) during formation of each heat plate 702. In yet other embodiments, the heat plates 702 may be formed by additive manufacturing to include mechanical interfaces for coupling the heat exchange structures 704 and the fuel rods thereto.

Each of the fuel rods 200, 401, 500, 600, the bundles 300, 400, and the assembly 700 may be formed by additive manufacturing processes with the system 100 (FIG. 1) described above. In some such embodiments, the fuel rods, bundles, and assembly are formed layer by layer be disposing a layer of a powder material on a surface of a substrate or a previously-formed layer, exposing the powder material to energy from the energy source, forming another layer of a powder material on the surface of the previously-formed layer, exposing the another layer of the powder material to energy, and repeating the disposing powder material and exposing the powder material to energy until a structure having a desired size and shape is formed.

As described above, exposing the powder material to energy from the energy source may form inter-granular bonds between the particles of the powder material and underlying layers of the structure being formed. In some embodiments, at least a portion of the structure being formed may not be formed to a substantially full theoretical density after the additive manufacturing process. In some such embodiments, the structure formed by the additive manufacturing process may be exposed to annealing conditions to densify at least a portion of the article.

In some embodiments, after the structure 108 is formed by additive manufacturing with the system 100, the structure 108 may be densified. Densifying the structure 108 may be performed by swaging, extrusion, hot isostatic pressing, thermal soaking, laser annealing, or combinations thereof. In some embodiments, the structure 108 is exposed to annealing (e.g., sintering) conditions to densify at least a portion thereof. In some embodiments, the structure 108 may be subjected to a hot isostatic pressing (HIP) process, a sintering process, a spark plasma sintering (SPS) process, or other densification process. By way of nonlimiting example, the structure 108 may be sintered to substantially fully densify the structure thereof. In some embodiments, densifying the structure 108 may include densifying at least a portion of the structure 108 while substantially not densifying at least another portion of the structure 108. By way of nonlimiting example, with reference to FIG. 2A and FIG. 2B, the cladding 204 may be annealed and densified, while the nuclear fuel material 202 is not annealed. In some such embodiments, exposing the structure 108 to annealing conditions may include exposing the structure 108 to a melting temperature greater than a melting temperature of the cladding 204 and lower than a melting temperature of the nuclear fuel material 202. Without wishing to be bound by any particular theory, it is believed that because the nuclear fuel material 202 exhibits a higher melting temperature than the cladding 204, the nuclear fuel material 202 is not densified or annealed while the cladding 204 is annealed. As another nonlimiting example and with reference to FIG. 7, the heat plates 702 and heat exchange structures 704 may be annealed and densified while nuclear fuel materials in fuel rods associated with the assembly 700 are not substantially densified.

Exposing the structure 108 to annealing conditions may include disposing the structure 108 in a die and exposing the structure 108 to a suitable temperature and pressure to densify at least a portion of the structure 108. In some embodiments, the die may not comprise graphite to prevent formation of binary or ternary compounds comprising carbon. In some such embodiments, the die may comprise tungsten carbide, molybdenum, or a combination thereof. Where the die comprises graphite, the surfaces of the sintered structure 108 may be exposed to a reducing agent to remove any carbon contamination (e.g., binary or ternary compounds including carbon) from the sintered structure 108, such as by exposing the surfaces of the sintered structure 108 to hydrogen gas.

Figure 8:
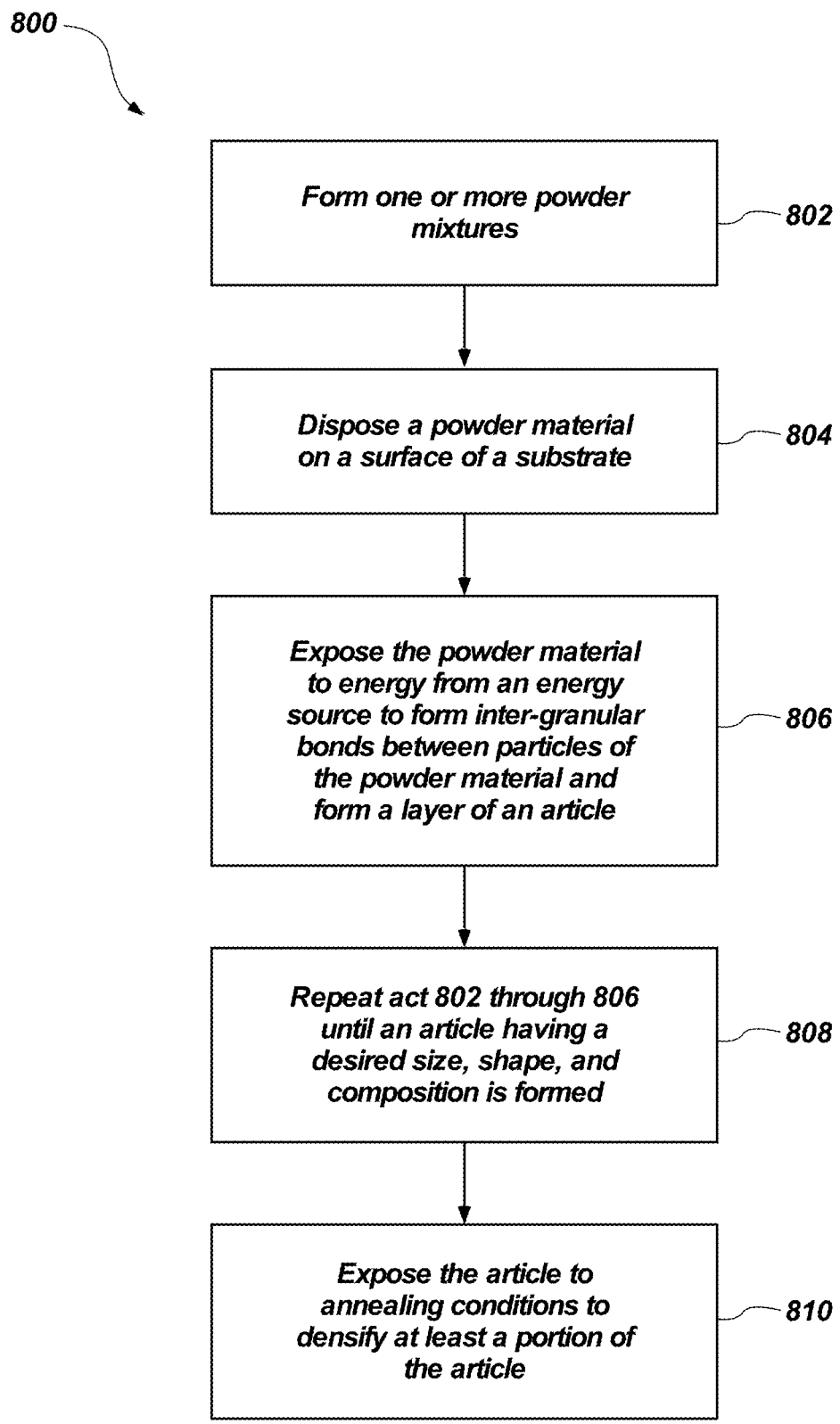
FIG. 8 is a simplified flow diagram illustrating a method of forming an article, in accordance with embodiments of the disclosure.

FIG. 8 is a simplified flow diagram illustrating a method 800 of forming an article, in accordance with embodiments of the disclosure. The method 800 includes act 802 including forming one or more powder mixtures; act 804 including disposing a powder material on a surface of a substrate; act 806 including exposing the powder material to energy from an energy source to form inter-granular bonds between particles of the powder material and form a layer of an article; act 808 including repeating act 802 through 806 until an article having a desired size, shape, and composition is formed; and act 810 including exposing the article to annealing conditions to densify at least a portion of the article.

Act 802 includes forming one or more powder mixtures. Forming the one or more powder mixtures may include forming a powder mixture for each component of an article (e.g., a nuclear fuel material, a fuel rod, a bundle of fuel rods, etc.) to be formed. By way of nonlimiting example, a powder mixture may be formed to include particles of a nuclear fuel material, such as particles of uranium and a metal material such as at least one of zirconium and tungsten. In some embodiments, the uranium and the metal material may not be mixed. Other powder materials may include particles of a cladding material, particles of a diffusion barrier material, particles of a poison material, particles of a heat pipe, one or more dopant materials to be interspersed in a nuclear fuel material, and combinations thereof.

Act 804 includes disposing a powder material on a surface of a substrate. The substrate may comprise a previously-formed layer of the article. The powder material may be disposed on the surface of the substrate such that the layer of the article being formed exhibits a desired cross-sectional composition. In some embodiments, particles of cladding material may be disposed around particles of a nuclear fuel material. Particles of a fission barrier material may be disposed between the particles of the nuclear fuel material and the particles of the cladding material. In some embodiments, the powder material may further include particles of a neutron reflector material, particles of a burnable poison material, particles of a heat pipe, or particles of another material. In some embodiments, the substrate may be heated while disposing the powder material on a surface of the substrate. By way of nonlimiting example, the substrate may be heated to between about 50° C. and about 150° C., such as between about 50° C. and about 100° C. or between about 100° C. and about 150° C.

Act 806 includes exposing the powder material to energy from an energy source to form inter-granular bonds between particles of the powder material and form a layer of an article. In some embodiments act 804 and act 806 occur substantially at the same time. In other words, in some such embodiments, the powder material may be exposed to energy from the energy source substantially simultaneously with disposing the powder material on the surface of the substrate.

Act 808 includes repeating act 802 through 808 until an article having a desired size, shape, and composition is formed. In some embodiments, one or more layers of the article may be formed to exhibit a different composition than one or more other layers of the article. By way of nonlimiting example, in some embodiments, a layer comprising a nuclear fuel material and a cladding material may be formed over one or more layers comprising a neutron reflector material surrounded by a cladding material. After forming the nuclear fuel and the cladding to a desired dimension, one or more layers of the neutron reflector material surrounded by the cladding material may be formed over the nuclear fuel and the cladding to form a fuel rod comprising the nuclear fuel with a neutron reflector above and below the nuclear fuel, the neutron reflectors and the nuclear fuel surrounded by the cladding.

Act 810 includes exposing the article to annealing conditions to densify at least a portion of the article. In some embodiments, the article is removed from the additive manufacturing tool and disposed in a die to densify at least a portion of the article. Exposing the article to annealing conditions may include densifying, for example, the cladding while substantially not densifying the nuclear fuel material. In some such embodiments, the article is exposed to a temperature between about 700° C. and about 1,600° C., such as between about 700° C. and about 800° C., between about 800° C. and about 1,000° C., between about 1,000° C. and about 1,200° C., between about 1,200° C. and about 1,400° C., or between about 1,400° C. and about 1,600° C.

Forming the nuclear fuel to comprise a metallic foam and exhibit a porosity as described herein may facilitate operation of a fuel cell including the nuclear fuel without the use of sodium or other another material (e.g., helium) between the nuclear fuel and the cladding. The porosity of the nuclear fuel may facilitate reduced expansion of the nuclear fuel during operation of the nuclear reactor including the fuel rod and may reduce undesired stresses on the cladding wall. In other words, the porosity of the nuclear fuel incorporates sufficient void space to accommodate the swelling of the nuclear fuel without causing stress on the cladding. In addition, forming the fuel rod without sodium may eliminate sodium bonding between sodium and the cladding and eliminate requirements of reprocessing of sodium after use of the fuel rod.

The nuclear fuel may be formed to include one or more dopants therein to reduce or prevent melting or sintering thereof during operating conditions of a fuel rod including the nuclear fuel. In some embodiments, the one or more dopants may reduce or prevent creep (i.e., slumping) of the fuel rod during operating conditions thereof when the fuel rod is exposed to excessive temperatures.

Accordingly, one or more components of a nuclear reactor (e.g., a fuel rod) may be fabricated with internal features, external features, or both for coupling the component to heat exchange mechanisms or power conversion mechanisms. In some embodiments, a fuel rod includes one or more annular spaces within the nuclear fuel material through which a cooling fluid may flow.

Forming structures according to embodiments described herein may facilitate fabrication of intricately coupled fuel cladding systems, rapid production of components for a nuclear reactor, implementation of complex physical features of structures of a nuclear reactor, reduction in fabrication time and material waste, and formation of gradients in components (e.g., a nuclear fuel) of the nuclear reactor. In addition, one or more components of a nuclear reactor may be formed without welds connecting different portions of a nuclear reactor core.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of forming a fuel rod for a nuclear reactor, the method comprising:
    disposing a powder comprising particles of a fuel material on a substrate;
    exposing the powder to energy from an energy source to form a first layer of a nuclear fuel comprising inter-granular bonds between adjacent particles of the fuel material in the first layer;
    disposing additional powder comprising particles of the fuel material over the first layer of the nuclear fuel; and
    exposing the additional powder to energy from the energy source to form a second layer of the nuclear fuel comprising inter-granular bonds between adjacent particles of the additional powder and between particles of the additional powder and the first layer of the nuclear fuel to form the nuclear fuel to have a void fraction greater than about 0.20.

2. The method of claim 1, further comprising:
    disposing a powder comprising particles of a cladding material around the powder comprising particles of the fuel material; and
    exposing the particles of the cladding material to energy from the energy source to form cladding around the nuclear fuel.

3. The method of claim 2, further comprising exposing the cladding and the nuclear fuel to annealing conditions to densify the cladding without densifying the nuclear fuel.

4. The method of claim 1, wherein disposing a powder comprising particles of a fuel material on a substrate comprises disposing a powder comprising between 1.0 weight percent and 15.0 weight percent uranium and between 85.0 weight percent and 99.0 weight percent zirconium on the substrate.

5. The method of claim 1, wherein disposing additional powder comprising particles of the fuel material over the first layer of the nuclear fuel comprises disposing additional powder comprising a different composition of the fuel material than the powder of the first layer of the nuclear fuel.

6. The method of claim 5, wherein exposing the additional powder to energy from the energy source to form a second layer of the nuclear fuel comprises forming the second layer to have a different composition than the first layer.

7. The method of claim 6, wherein exposing the additional powder to energy from the energy source to form a second layer of the nuclear fuel comprises forming the first layer to comprise a different amount of enriched nuclear fuel than the second layer.

8. The method of claim 1, further comprising exposing the nuclear fuel to annealing conditions to densify at least a portion of the nuclear fuel.

9. The method of claim 8, wherein exposing the nuclear fuel to annealing conditions comprises exposing the nuclear fuel to at least one of a spark plasma sintering process or a hot isostatic pressing process.

10. The method of claim 1, wherein disposing a powder comprising particles of a fuel material on a substrate comprises disposing a powder comprising particles of the fuel material and particles of a burnable poison material on the substrate.

11. The method of claim 1, further comprising disposing particles of a diffusion barrier material on the substrate, wherein exposing the powder to energy from an energy source to form a first layer of a nuclear fuel comprises exposing the particles of the diffusion barrier material to energy from the energy source to form a diffusion barrier around the fuel material.

12. The method of claim 1, wherein disposing a powder comprising particles of a fuel material on a substrate comprises disposing a powder comprising particles of the fuel material and at least one dopant on the substrate.

13. The method of claim 12, wherein disposing a powder comprising particles of the fuel material and at least one dopant on the substrate comprises disposing a powder comprising particles of the fuel material and at least one dopant selected from the group consisting of carbon nanotubes, zirconium oxide, aluminum oxide, and combinations thereof on the substrate.

14. The method of claim 1, wherein disposing a powder comprising particles of a fuel material on a substrate comprises disposing a powder comprising particles of uranium and zirconium on the substrate.

15. The method of claim 1, wherein exposing the powder to energy from an energy source to form a first layer of a nuclear fuel comprises forming the first layer of the nuclear fuel to define an aperture through a central portion of the first layer of the nuclear fuel.

16. The method of claim 1, wherein disposing a powder comprising particles of a fuel material on a substrate comprises disposing a powder comprising about 10 atomic percent uranium and about 90 atomic percent of at least one of zirconium and tungsten on the substrate.

17. The method of claim 1, wherein exposing the powder to energy from an energy source to form a first layer of a nuclear fuel comprises forming the first layer of the nuclear fuel to exhibit a composition varying with a radial distance from a center of the first layer.

18. The method of claim 1, further comprising disposing a powder comprising particles of a cladding material around the powder comprising particles of the fuel material, an enrichment of the nuclear fuel greater proximate the cladding material than at portions distal from the cladding material.

19. The method of claim 1, wherein exposing the powder to energy from an energy source to form a first layer of a nuclear fuel comprises exposing the powder to energy to form a first layer of an article comprising a bundle of fuel rods.

20. A method of forming a portion of a nuclear reactor, the method comprising:
  exposing powder comprising at least a nuclear fuel material and a cladding material to energy to form a first layer of an article;
  disposing additional powder over the first layer of the article to form a layer of the additional powder over the first layer of the article; and
  exposing the additional powder to energy to form a second layer of the article, wherein the second layer of the article has a same cross-sectional shape as the first layer of the article, the same cross-sectional shape being rotationally offset from the first layer of the article.

21. The method of claim 20, wherein exposing a powder comprising at least a nuclear fuel material and a cladding material to energy to form a first layer of an article comprises forming the first layer of the article to have a theoretical density less than about 90% theoretical density.

22. The method of claim 20, wherein exposing powder comprising at least a nuclear fuel material and a cladding material to energy to form a first layer of an article comprises exposing a powder comprising uranium and at least one of a metal oxide and carbon nanotubes to the energy.

23. The method of claim 20, wherein exposing powder comprising at least a nuclear fuel material and a cladding material to energy to form a first layer of an article comprises exposing a powder comprising at least a nuclear fuel material and a cladding material to energy to form a first layer of an article comprising a bundle of fuel rods.

* * * * *

UNITED STATES PATENT AND TRADEMARK OFFICE
CERTIFICATE OF CORRECTION

PATENT NO. : 11,183,309 B2
APPLICATION NO. : 16/220661
DATED : November 23, 2021
INVENTOR(S) : Robert C. O'Brien Page 1 of 1

It is certified that error appears in the above-identified patent and that said Letters Patent is hereby corrected as shown below:

In the Specification

Column 10, Line 17, change "fuel rod 208, 200" to --fuel rod 200,--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*